W. P. McGEOUCH.
MACHINE FOR CUTTING RUBBER RINGS.
APPLICATION FILED NOV. 28, 1910.

983,387.

Patented Feb. 7, 1911.

4 SHEETS—SHEET 1.

Witnesses:

Inventor,
William P. McGeouch

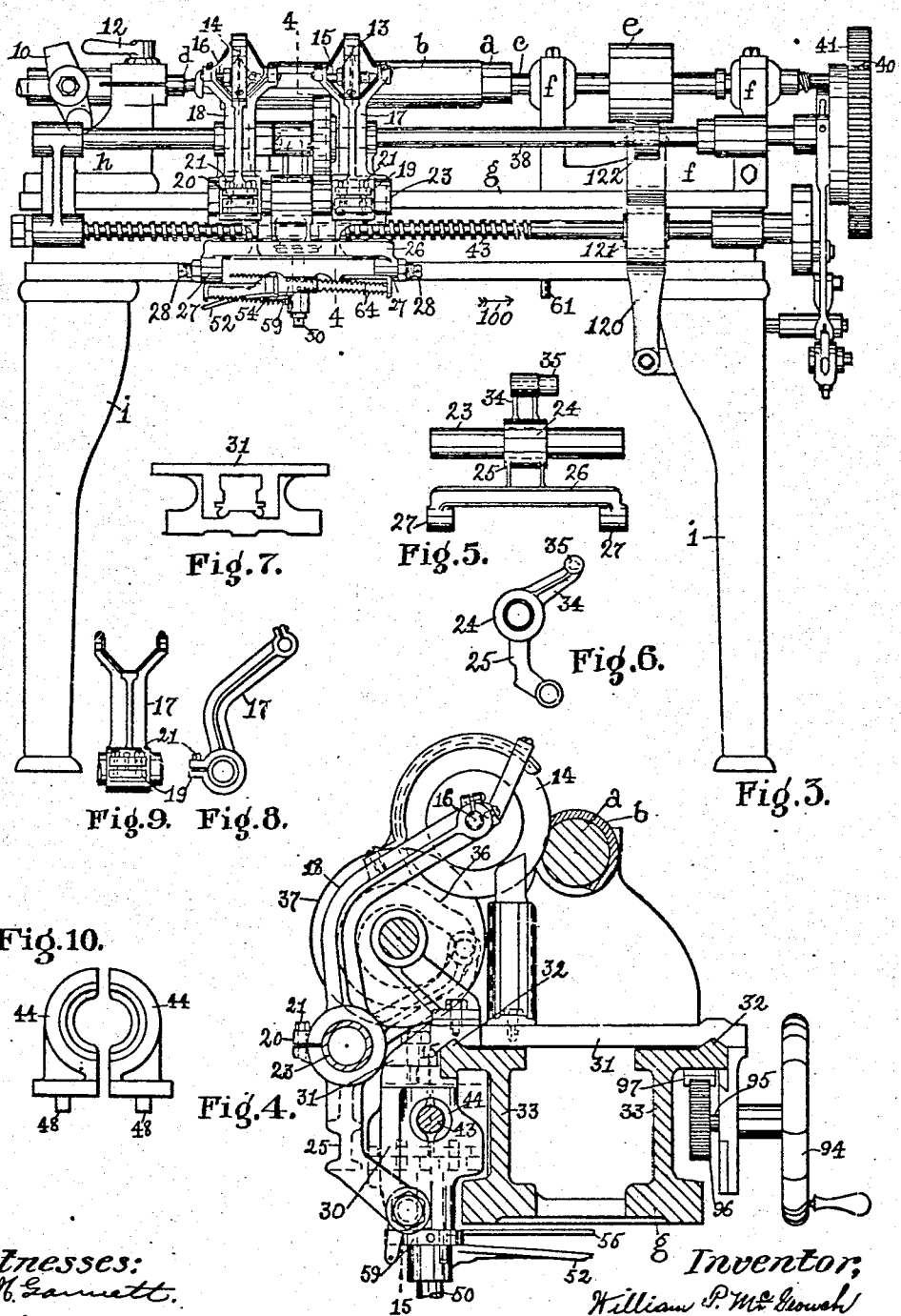

W. P. McGEOUCH.
MACHINE FOR CUTTING RUBBER RINGS.
APPLICATION FILED NOV. 28, 1910.

983,387.  Patented Feb. 7, 1911.
4 SHEETS—SHEET 3.

Witnesses.
C. H. Bannett
J. Murphy

Inventor:
William P. McGeouch
by Jas. H. Churchill
Atty.

W. P. McGEOUCH.
MACHINE FOR CUTTING RUBBER RINGS.
APPLICATION FILED NOV. 28, 1910.

983,387.

Patented Feb. 7, 1911.
4 SHEETS—SHEET 4.

Witnesses:

Inventor,
William P. McGeouch

UNITED STATES PATENT OFFICE.

WILLIAM P. McGEOUCH, OF SOMERVILLE, MASSACHUSETTS.

MACHINE FOR CUTTING RUBBER RINGS.

983,387.     Specification of Letters Patent.     Patented Feb. 7, 1911.

Application filed November 28, 1910. Serial No. 594,445.

*To all whom it may concern:*

Be it known that I, WILLIAM P. McGEOUCH, a citizen of the United States, residing in Somerville, county of Middlesex, and State of Massachusetts, have invented an Improvement in Machines for Cutting Rubber Rings, of which the following description, in connection with the accompanying drawings, is a specification, like letters on the drawings representing like parts.

This invention relates to a machine for cutting individual rings from a tube or sleeve of rubber or like yielding material, and is an improvement upon the machine shown and described in United States Patent No. 948,401 granted to me February 8, 1910.

The present invention has for its object to increase the production of machines of the class referred to, and for this purpose I employ a plurality of knives or cutters which are mounted on a single carriage and are simultaneously operated by a common actuating device, whereby a plurality of rings may be cut simultaneously from a sleeve or tube of rubber or other yielding material.

The invention further has for its object to improve and simplify machines of the class referred to.

These and other features of this invention will be pointed out in the claims at the end of this specification.

Figure 1:
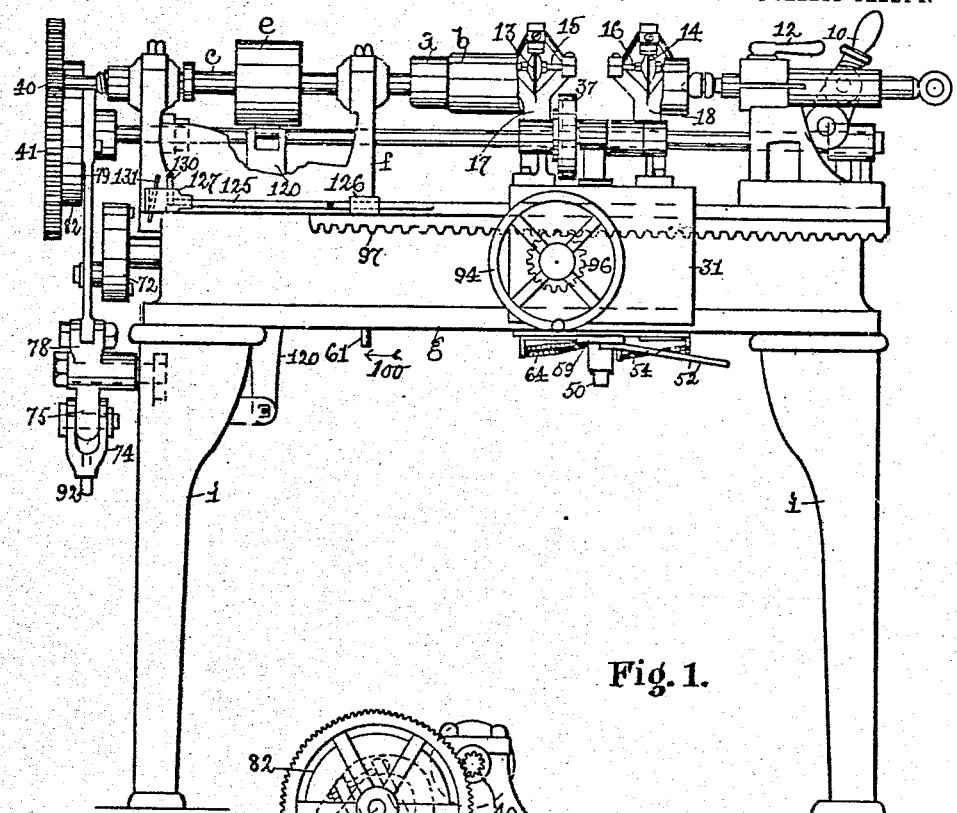
Figure 2:
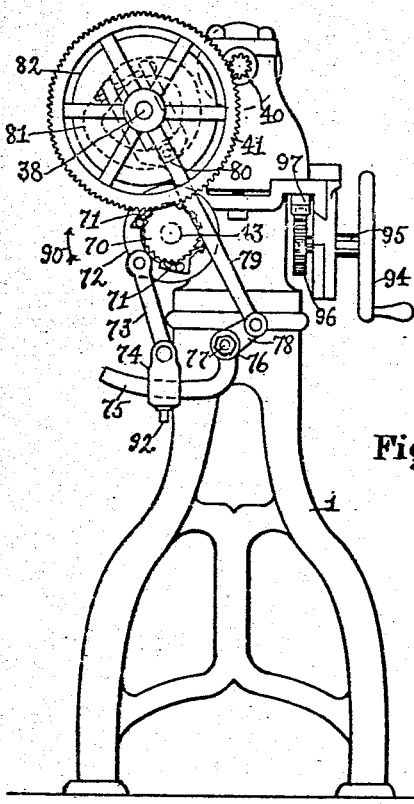
Figure 11:
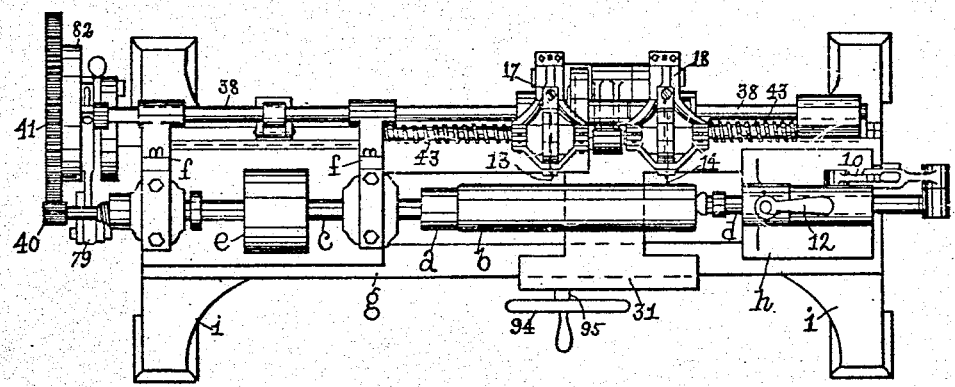
Figure 12:
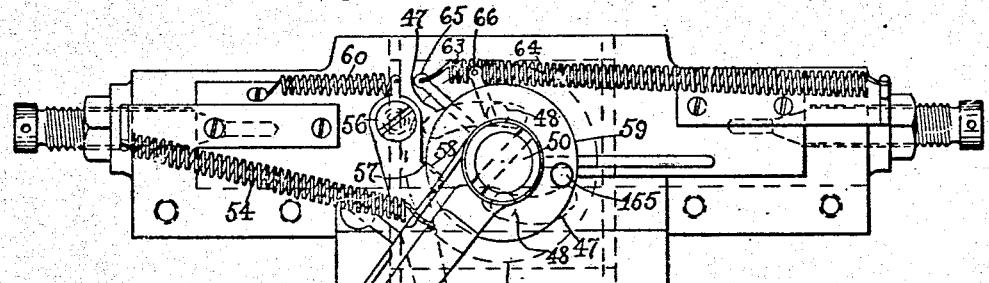
Figure 13:
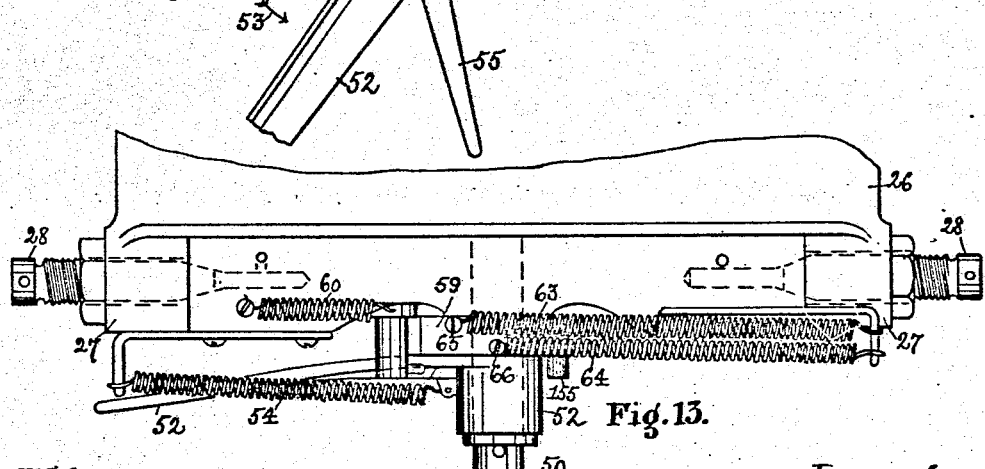
Figure 14:
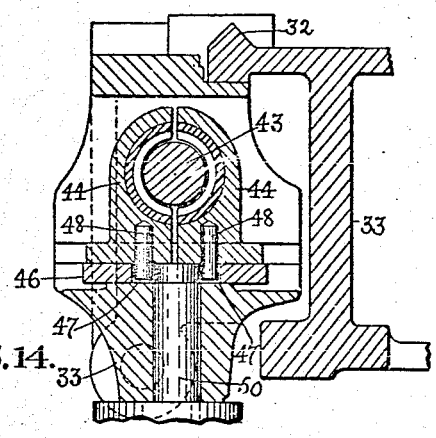
Figure 15:
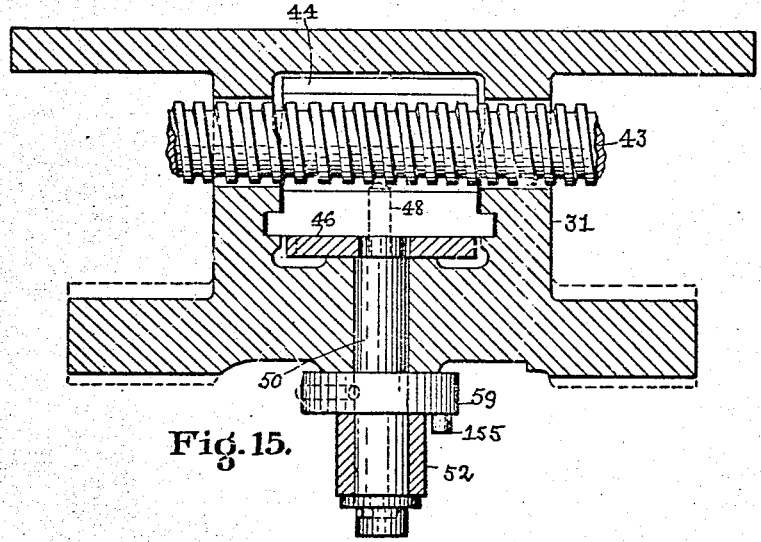
Figure 16:
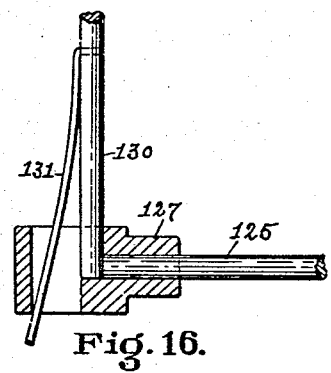

Figure 1 is a front elevation, and Fig. 2, an end elevation of a machine embodying this invention. Fig. 3, a rear side elevation. Fig. 4, an enlarged section taken on the irregular line 4—4, Fig. 3. Fig. 5, an elevation of the knife carrying lever. Fig. 6, a side elevation of the same. Fig. 7, an elevation of the carriage for the knife lever. Figs. 8 and 9, details of the knife carrying arms. Fig. 10, a detail of the split nut. Fig. 11, a plan of the machine shown in Fig. 1. Fig. 12, an underside view of the carriage. Fig. 13, a detail of the carriage on an enlarged scale. Figs. 14 and 15, enlarged details in section to be referred to, and Fig. 16, a detail to be referred to.

Referring to the drawing $a$ represents a mandrel upon which is placed a tube or sleeve $b$ of rubber or other yielding material, which it is desired to cut up into rings. The mandrel $a$ is centered between the two parts $c$, $d$, of a main shaft, which is revolved at a substantially high speed by means of a belt (not shown), but which is passed about the pulley $e$ on the part $c$ of the main shaft, said part having bearings in a frame $f$ erected upon the bed $g$ of the machine, and the part $d$ being supported by an upright $h$ erected upon the bed at its opposite end, said bed having suitable legs $i$. The part $d$ of the shaft is movable longitudinally toward and from the part $c$ to enable the mandrel $a$ to be placed into operative relation to the shaft, so as to revolve therewith and to be replaced when the tube $b$ has been cut up into rings. The part $d$ may be moved longitudinally by means of a lever 10 and may be secured in its forward or operative position by a clamping lever 12, in a manner well understood.

In accordance with this invention, the mandrel $a$ has coöperating with it a plurality of cutters or knives, preferably circular disks having circumferential cutting edges. In the present instance, I have shown two circular disk knives or cutters 13, 14, loosely mounted upon shafts or arbors 15, 16, supported by the forked ends of levers or arms 17, 18, provided as herein shown with split hubs 19, 20, (see Figs. 3, 8 and 9), which are adjustably secured as by the screws 21 on a stationary pin or shaft 23 extended through a hub 24 on a lever 25 (see Figs. 3 and 5). The lever 25 is provided at its lower end with a cross bar 26 having hubs 27, which carry pivot screws 28, which enter suitable sockets in the opposite sides of a depending arm 30 secured to or forming part of a carriage 31, which is mounted to slide on ways 32 on the side bars 33 of the bed $g$ of the machine. The lever 25 is provided with an arm 34 carrying a stud or roll 35, which enters a cam groove or path 36 in one face or side of a disk 37, splined on a shaft 38 to rotate therewith and to move longitudinally thereon, the said shaft, which will hereinafter be referred to as the cam shaft, being driven from the main shaft by a pinion 40 on the latter meshing with a large gear 41 on the cam shaft, whereby the latter shaft is caused to rotate at a materially slower speed than the main shaft. The cam path 36 is shaped so as to move both knives 13, 14, into engagement with the sleeve or tube $b$ on the mandrel, and cause the said knives to simultaneously cut two rings from the said sleeve or tube, and to then move the knives backward and out of engagement with the tube or sleeve $b$ and to hold said knives in their inoperative position, while the carriage is fed lengthwise of the mandrel a distance substantially equal to the thickness of a ring. The carriage 33 is fed forward by a screw-shaft 43, which is intermittently rotated as will be described, and to which the carriage is clamped or clutched by a split nut 44, shown separately in Fig. 10, which is adapted to be engaged with the screw-thread of the shaft 43 by a cam disk 46 (see Figs. 12, 14 and 15) provided with cam slots 47, into which extend studs or projections 48 on the two halves of the split nut 44, so that when the cam disk is turned in one direction, the two halves of the nut are engaged with the screw shaft 43, and when turned in the opposite direction are disengaged therefrom. The two halves of the split nut 44 are vertically arranged, and the cam disk 46 is horizontally arranged and is fast to a vertically arranged shaft 50, which is extended down through the bottom of the carriage 33. The shaft 50 below the carriage 33 has loose on it a handle 52, which is designed to be turned by the operator in the direction of the arrow 53, Fig. 12, when it is desired to clamp the carriage to the screw-shaft 43. The handle 52 is moved in the opposite direction into its starting position by the spring 54.

Provision is made for locking or holding the cam disk 46 in its operative position, and for this purpose, I employ a lever 55, which is pivoted at 56 to the underside of the carriage and is provided with a tooth 57, which is adapted to enter a notch or recess 58, in the periphery of a collar 59 fast on the shaft 50 and provided with a pin 155, which is engaged by the lever 52 to turn the collar 59. The tooth 57 is held in the notch or recess 58 by a spring 60 (see Fig. 11) connected with the lever 55, which is arranged with relation to the collar 59 so as to extend substantially at right angles to the path of movement of the carriage when said lever is in locking engagement with the collar 59. The locking lever 55 in its operative position shown in Figs. 4 and 11 coöperates with a pin or projection 61 (see Fig. 3) on the underside of the bed near one end thereof, and is designed to engage the same at or about the time the carriage has reached the end of its movement in its forward direction, indicated by the arrow 100 in Figs. 1 and 3, so that further movement of the carriage will carry the recessed collar 59 away from the locking lever and disengage said collar from the tooth 57, whereupon the springs 63, 64, attached at one end to arms 65, 66, extended from the collar 59 and at their other ends to the carriage, act to turn the shaft 50 and the cam disk 46, so as to open the split nut and release the carriage from its operating shaft 43.

The screw-shaft 43 is rotated intermittently so as to effect a step by step feed of the carriage after the rings have been cut and the knives have been withdrawn from the rubber sleeve or tube b. For this purpose, the screw-shaft 43 has fast on it a ratchet wheel 70 (see Fig. 2) with which coöperate a plurality of pawls 71 pivoted to a flanged disk 72 loosely mounted on the shaft 43, said disk being connected by the rod 73 to block 74 mounted to slide on an arm 75 of a lever 76, mounted to turn on a stud 77 attached to the frame of the machine, said lever having its short arm 78 joined to a rod 79, which is forked at its upper end to straddle the shaft 38, and is provided with a stud or roller 80, which enters a cam groove 81 in one face or side of a disk 82 fast on the shaft 38. By reference to Fig. 2, it will be seen that rotation of the cam disk 82 reciprocates the rod 79, which oscillates the lever 76 and through the block 74 and link or rod 73 oscillates the pawl carrying disk 72, the latter on its movement in one direction, indicated by the arrow 90 causing the pawls to turn the ratchet wheel 70 and its screw shaft 43, a sufficient distance to feed the carriage forward a distance substantially equal to the thickness of a ring. On the backward movement of the pawl-carrying disk 72, the pawls click by the teeth of the ratchet wheel 70 without moving the latter or its shaft 43, consequently the said shaft and the carriage for the knives remain stationary while the rings are being cut. The feed of the carriage may be varied by adjusting the block 74 on the lever arm 75. The block 74 may be secured in its adjusted position by the set screw 92.

In operation, the carriage 31 is moved into its starting position by the operator turning the hand wheel 94 mounted on the shaft 95 having a pinion 96, which meshes with a rack bar 97 attached to the bed of the machine. When the carriage has been thus placed, the knives 13, 14, are adjusted with relation to the tube or sleeve b, which is effected by turning the arms or levers 17, 18, on their pivot rod 23, and when the knives are properly positioned the said arms or levers are rendered fast on the pivot rod 23 by the screws 21. The handle 52 is then turned to engage the stud or pin 155 on the collar 59 and the shaft 50 and move the latter into the position shown in Fig. 11 so as to bring the notch 58 into engagement with the tooth 57 and thus clutch the carriage to the feed shaft 43. As soon as the notch 58 in the collar 59 is engaged with the tooth 57, the handle 52 is released by the operator and is returned to its starting position by the spring 54. The machine is then started in operation in a manner well understood, and at each rotation of the cam shaft, the lever 25 is moved toward and from the mandrel. On the movement of the lever toward the mandrel, the knives or cutting disks engage the tube or sleeve and cut through the same so as to form two rings simultaneously, after which the knives are withdrawn from engagement with the tube or sleeve and are maintained in this latter position by the cam 36, while the carriage is being fed forward the distance substantially equal to the thickness of a ring. At or near the end of the forward feed of the carriage in the direction indicated by the arrow 100 in Fig. 3, the lever 55 strikes the stop pin 61 and releases the carriage from the feed shaft 43, after which the carriage can be returned to its starting position by hand as above described.

It will be observed that the levers or arms 17, 18, carrying the knives are each capable of being turned back on the pivot rod 23 by merely loosening the set screws 21, which enables either knife to be adjusted, replaced or sharpened without interfering with the operation of the other.

Provision is made for stopping rotation of the feed shaft 43 to prevent overfeeding of the carriage, and for this purpose, I employ a brake comprising an arm or lever 120 (see Fig. 3), which engages a collar 121 fast on the screw shaft 43. The brake arm 120 is forced into engagement with the collar 121 by a cam 122 fast on the shaft 38 and acting on the upper end of the brake arm. The cam 122 is suitably shaped to apply the brake at each revolution of the shaft 38 when the carriage has been fed forward the proper distance. Provision is also made for taking the power off of the machine at or about the time the carriage has reached the end of its forward travel, and for this purpose, I have provided a rod 125 which is mounted to slide in suitable bearings 126, 127 on the bed of the machine (see Fig. 1) and which is arranged to be engaged by the carriage 33 on the forward movement of the latter in the direction of the arrow 100, Fig. 1. The rod 125 abuts against a vertically arranged rod 130, which is operatively connected with a shipper, not shown, for the belt not shown, which drives an overhead shaft, not shown, to which the pulley e is belted. The vertically arranged shipper rod 130 is elevated to ship the main belt, not shown, and is supported in this position by the bearing 127 (see Figs. 1 and 16), in which position it is retained by a spring 131 until dislodged therefrom by the carriage 33 engaging the rod 125 and moving the latter so as to push the shipper rod 130 off from its support, whereupon the shipper rod drops and throws the main belt into its inoperative position.

Claims:

1. In a machine of the character described, in combination, a tube supporting mandrel, and a carriage, one of said parts being movable longitudinally with relation to the other, means for intermittently feeding said movable part, a plurality of knives, arms carrying said knives, a lever pivoted to said carriage and on which said arms are mounted to turn, means to secure said arms in fixed relation to said lever, and a cam coöperating with said lever to move the same toward the mandrel, substantially as described.

2. In a machine of the character described, in combination, a tube supporting mandrel, and a carriage, one of said parts being movable longitudinally with relation to the other, means for intermittently feeding said movable part, a plurality of knives, arms carrying said knives, a lever to which said arms are adjustably secured, and a cam to move said lever on its pivot toward said mandrel, substantially as described.

3. In a machine of the character described, in combination, a tube supporting mandrel, and a carriage, one of said parts being movable longitudinally with relation to the other, means for intermittently feeding said movable part, a plurality of knives, supports for said knives capable of being moved toward and from said mandrel simultaneously and independent of each other, and means for moving said supports toward said mandrel to bring the knives into engagement with said tube, substantially as described.

4. In a machine of the character described, in combination, a tube supporting mandrel, and a carriage, one of said parts being movable longitudinally with relation to the other, means for intermittently feeding said movable part, a plurality of knives capable of being moved independently of each other toward and from said mandrel, and means for simultaneously moving said knives toward said mandrel, substantially as described.

5. In a machine of the character described, in combination, a movable knife carriage, a screw shaft, means for connecting said carriage to said shaft, a ratchet wheel fast on said shaft, a pawl coöperating with said ratchet wheel, a carrier for said pawl loosely mounted on said screw-shaft, a pivoted lever having one arm connected with said pawl carrier, a reciprocating rod connected with the other arm of said lever, and a rotatable shaft provided with a cam for reciprocating said rod, substantially as described.

6. In a machine of the class described, in combination, a movable knife carriage, a screw-shaft, a split nut mounted on said shaft, a substantially horizontal disk having cam slots, pins on said split nut extended into said slots, a vertically arranged shaft carrying said cam disk and extended through the bottom of said carriage, a lever located below said carriage and mounted on said vertically arranged shaft to turn the same, a collar on said shaft provided with a notch in its periphery, a locking lever provided with a projection coöperating with said notch, a spring to maintain said projection in engagement with said notch, and a spring to turn the collar attached to said shaft when the said projection is disengaged from said notch, substantially as described.

7. In a machine of the character described, in combination, a tube supporting mandrel, a carriage movable longitudinally thereof, a knife carried by said carriage, a cam for moving said knife toward said mandrel, a shaft on which said cam is mounted, a screw shaft, means for connecting said carriage with said screw shaft, a brake coöperating with said screw shaft, and a cam coöperating with said brake to apply the same, substantially as described.

In testimony whereof, I have signed my name to this specification in the presence of two subscribing witnesses.

WILLIAM P. McGEOUCH.

Witnesses:
   WALTER W. NEWTON,
   JAS. J. CLIFFORD.